US012740917B1

(12) United States Patent
Johansson

(10) Patent No.: US 12,740,917 B1
(45) Date of Patent: Sep. 22, 2026

(54) TINNITUS NECK TAPPER

(71) Applicant: Bengt Johansson, Norco, CA (US)

(72) Inventor: Bengt Johansson, Norco, CA (US)

( * ) Notice: Subject to any disclaimer, the term of this patent is extended or adjusted under 35 U.S.C. 154(b) by 518 days.

(21) Appl. No.: 18/369,673

(22) Filed: Sep. 18, 2023

Related U.S. Application Data

(60) Provisional application No. 63/407,447, filed on Sep. 16, 2022.

(51) Int. Cl.
*A61H 23/00* (2006.01)
*A61H 23/02* (2006.01)

(52) U.S. Cl.
CPC ....... *A61H 23/006* (2013.01); *A61H 23/0218* (2013.01); *A61H 23/0254* (2013.01); *A61H 2023/002* (2013.01); *A61H 2201/1418* (2013.01); *A61H 2201/1609* (2013.01); *A61H 2201/165* (2013.01); *A61H 2201/1685* (2013.01); *A61H 2201/5005* (2013.01); *A61H 2201/503* (2013.01); *A61H 2205/04* (2013.01)

(58) Field of Classification Search
CPC .. A61H 23/006; A61H 23/02; A61H 23/0281; A61H 23/00; A61H 23/0254; A61H 23/04; A61H 7/004; A61H 39/04
See application file for complete search history.

(56) References Cited

U.S. PATENT DOCUMENTS

2021/0400407 A1 12/2021 Furman et al.

FOREIGN PATENT DOCUMENTS

| | | | | |
|---|---|---|---|---|
| CN | 108635193 A | * 10/2018 | A61H 9/005 |
| JP | 2011234741 A | * 11/2011 | |
| KR | 100887704 B1 | * 3/2009 | A61H 11/00 |
| WO | WO-2005089694 A1 | * 9/2005 | A61H 23/0218 |
| WO | WO-2020105593 A1 | * 5/2020 | A61H 23/02 |

OTHER PUBLICATIONS

Machine translation of WO-2020105593-A1. Accessed from PE2E Search on Apr. 2026. (Year: 2020).*
Machine translation of WO-2005089694-A1. Access from PE2E Search on Apr. 2026 (Year: 2005).*
Machine translation of KR-100887704-B1. Accessed from PE2E Search on Apr. 2026 (Year: 2009).*
Machine translation of JP-2011234741-A. Accessed from PE2E Search on Apr. 2026. (Year: 2011).*
Machine translation of CN-108635193-A. Accessed from PE2E Seach on Apr. 2026 (Year: 2018).*

* cited by examiner

*Primary Examiner* — Joseph D. Boecker
*Assistant Examiner* — Jaeick Jang
(74) *Attorney, Agent, or Firm* — Kirk A. Buhler; Buhler & Associates Patenting

(57) ABSTRACT

Improvements for a tinnitus therapy device to reduce tinnitus to a person. The device wraps at least partially around the neck to provide stimulation to the muscles and nerves in the neck to provide stimulation that reduces “ringing in the ears”. The device provides intermittent tapping to one side, both sides, alternating sides or at some pattern. The device is adjustable to position the tapping to the optimal location. The device only applies external forces and is self-controlled or controlled by a therapist. The controls for operation can be integrated in a retention mechanism that can be a fabric covering that can be stretched or pulled over the device and removed for replacement, cleaning or washing of the covering. There can be controls for different forces and tapping rates with wired or wireless controls.

17 Claims, 4 Drawing Sheets

TINNITUS NECK TAPPER

CROSS-REFERENCE TO RELATED APPLICATIONS

This application claims the benefit of Provisional Application Ser. No. 63/407,447 filed Sep. 16, 2023, the entire contents of which is hereby expressly incorporated by reference herein.

PRIOR ART

U.S. Published application No. 20210400407 was published for Adam Charles Furman et al. and is titled Haptic Tinnitus Therapeutic System. This application discloses a computer-implemented method of managing tinnitus of a user with at least one wearable device includes: actuating, according to a prescribed pattern and using the at least one wearable device: a) an electro-acoustic transducer to provide an audio output to the user, and b) a contact element to apply vibration to a body part of the user, where the prescribed pattern both stimulates the nervous system of the user and delivers a sound to the user, which together mitigate the tinnitus. While this publication discloses a tinnitus therapy device, the vibration is applied to the wrist of the user.

What is needed is a tinnitus therapy device that applies repeated stimulation to the back of the neck of a user. The proposed tinnitus neck tapper provides the solution.

BACKGROUND OF THE INVENTION

Tinnitus is the perception of sound when no corresponding external sound is present. Tinnitus sufferers hear sounds often described such as "ringing in the ears", a high or low-pitched noise, buzzing, hissing, humming and roaring. The tinnitus phenomenon can vary in degrees of severity from one person to another and range from being mildly annoying to severe, where it can disrupt sleep, affect concentration, reduce hearing, and even cause depression and severely affect quality of life. There is no known cure for tinnitus, which is estimated to affect 15-20% of the world population. These are staggering numbers, affecting 50 million people in the U.S. alone, and nearly 20 million of those cases are considered chronic according to the American Tinnitus Association. Moreover, although tinnitus can affect anyone, the prevalence of chronic tinnitus increases significantly with age. Some present treatments involve masking using sound therapy devices where the ringing noise is intentionally drowned by other sounds such as music. Other present treatments involve dietary supplements as well as applying heat, pressure or massaging to the back of the neck, side of the head or about the ear.

SUMMARY OF THE INVENTION

It is an object of the tinnitus neck tapper to provide a device that reduces tinnitus to a person. The device is easily applied and used for a limited period to provide stimulation that reduces or eliminates the "ringing in the ears" experienced by tinnitus sufferers to provide relief.

It is an object of the tinnitus neck tapper to be applied to the back and sides of a neck. The device wraps at least partially around the neck to provide stimulation to the muscles and nerves in the neck, more specifically to the sternocleidomastoid muscle and mastoid process, and the eight cranial nerves. The foregoing are often a source of tinnitus, headaches, migraines, and vision issues. Proper stimulation and massaging of the SCM trigger points can reduce, eliminate, or provide temporary relief to a user.

It is an object of the tinnitus neck tapper to be a mechanical device that provides an intermittent tapping. The tapping can be produced using a number of different devices from motors that drive a CAM, solenoids or other mechanical devices that are controlled to produce abrupt or massaging forces. The force can be applied to only one-side, both sides, alternating sides or at some pattern.

It is another object of the tinnitus neck tapper to have a size adjustment so the location of the stimulation can be optimally located on the neck of a user. This provides a universal device that can be applied to children or to large adults. The device only applies external forces and is self-controlled or controlled by a therapist.

It is another object of the tinnitus neck tapper to be retained around the neck using one or a variety of mechanisms such as hook and loop fasteners or lanyards that can be held by each hand or one hand. The controls for operation can be integrated in the retention mechanism to provide a dead-man safety feature.

It is another object of the tinnitus neck tapper to provide a covered or enclosed mechanism. The covering can be with an enclosed housing or in a fabric or other material that conforms and encapsulates the operation mechanism. A covering of fabric or plastic can be stretched or pulled over the device and removed for replacement, cleaning or washing of the covering.

It is another object of the tinnitus neck tapper to have controls for operation and for control of the force of the tapping and the rate the tapping. Different forces and rates can have different results for a person. These can be controlled for a given period or for a finite number of taps. While the device may operate with a simple on-off switch it is also possible for the device to be operated using a wireless control such as Bluetooth or another device from a cellular device, tablet or computer.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
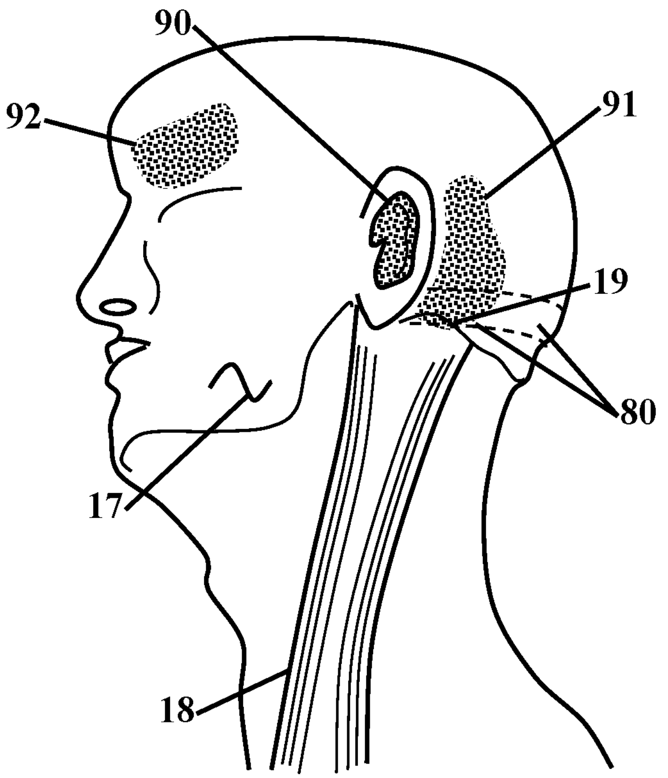
FIG. 1 shows the area of stimulation for the tinnitus neck tapper.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Item Numbers and Description

| | |
|---|---|
| 17 mandible | 18 sternocleidomastoid |
| 19 mastoid process | 20 tinnitus therapy device |
| 21 back wall | 22 L/R head(s) |
| 23 motor | 24 inner radius wall |
| 25 top housing | 26 switch |
| 27 charge circuit | 28 CAM |
| 29 CAM arm | 30 L/R head arm(s) |
| 31 L/R arm body | 32 charging port |
| 33 battery | 34 L/R spring(s) |
| 35 L/R solenoid(s) | 36 plunger |
| 37 pin | 38 slot |
| 39 coil winding | 40 L/R pivot(s) |
| 41 slot | 50 L/R housing(s) |
| 51 outer sleeve | 52 inner sleeve |
| 70 flexible sleeve | 80 stimulation area |
| 81 strap | 82 control buttons |
| 90 tinnitus | 91 auditory canal |
| 92 migraine | 93 pull |
| 94 slide | 95 rotate out |
| 96 extend | 97 rotate |
| 98 lift | 100 controller |
| 104 battery | 106 charge controller |
| 108 LED(s) | 110 Bluetooth |
| 120 plug | 122 transformer |
| 124 charge pad/plug | |

Figure 2:
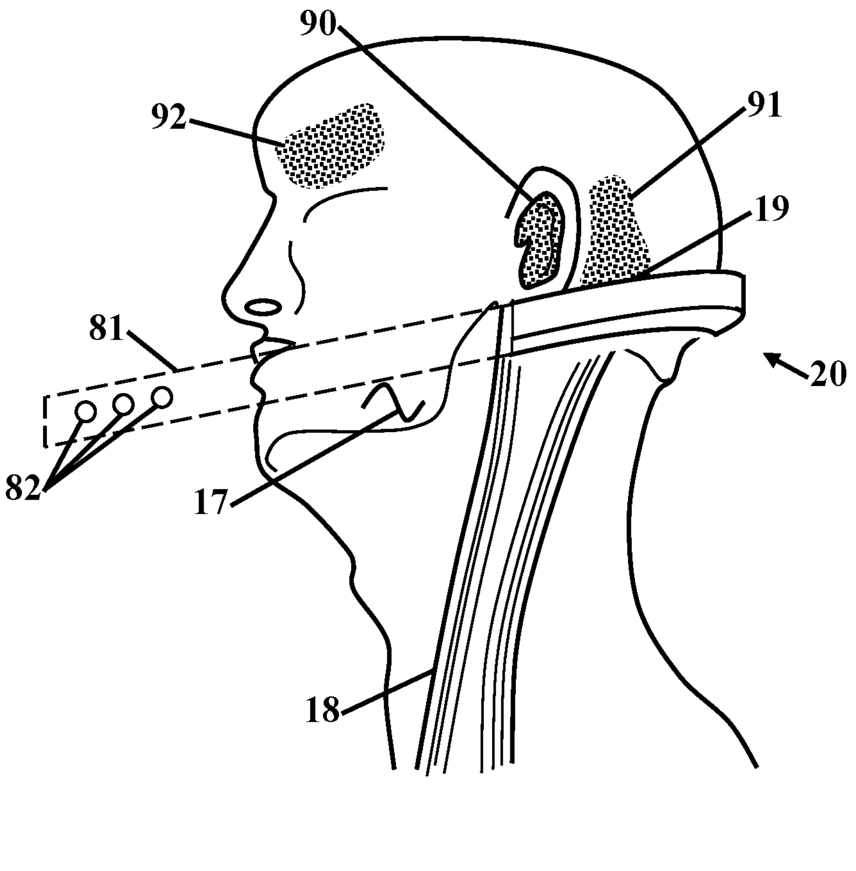
FIG. 2 shows the tinnitus neck tapper over the neck area from FIG. 1.

FIG. 1 shows the area of stimulation for the tinnitus neck tapper 20 and FIG. 2 shows the tinnitus neck tapper over the neck area from FIG. 1. Muscles and or nerves in the neck connect into and around the mastoid process 19 behind the sternocleidomastoideor eighth cranial nerve. The sternocleidomastoideoften been found to cause issues with migraine 92 and the auditory canal 91 that can result in tinnitus 90 or ringing in the ears. The tinnitus neck tapper 20 provides stimulation to the sides of the back and sides of a neck. The device wraps at least partially around the neck to provide stimulation to the muscles and nerves in the neck, more specifically to the sternocleidomastoideole and mastoid process. This muscle is often a source of tinnitus, headaches, migraines, and vision issues. Proper stimulation and massaging of the SCM trigger points can reduce, eliminate, or provide temporary relief to a user by tapping in the stimulation area(s) 80. In FIG. 2 the tinnitus neck tapper 20 is shown wrapping at least partially around the neck of a user. The tinnitus neck tapper 20 is shown with a strap 81 that can be grasped by a user to hold the inside of the tinnitus neck tapper 20 onto the neck. The strap 81 (or handle) is shown with button(s) 82 that can control activation and stimulation options for operation.

Figure 2A:
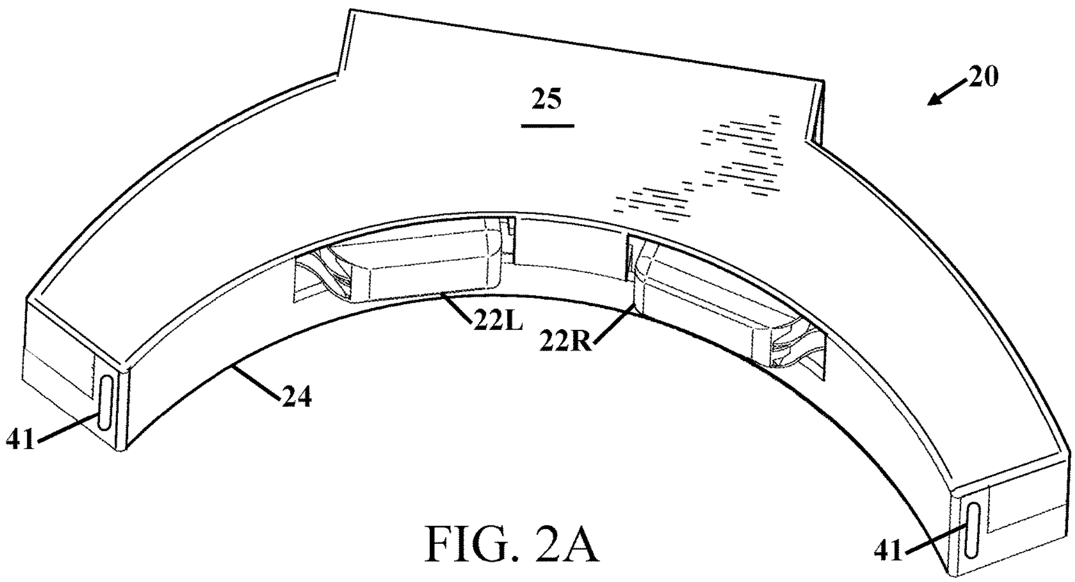
FIG. 2A shows a top perspective view of the tinnitus neck tapper.
Figure 2B:
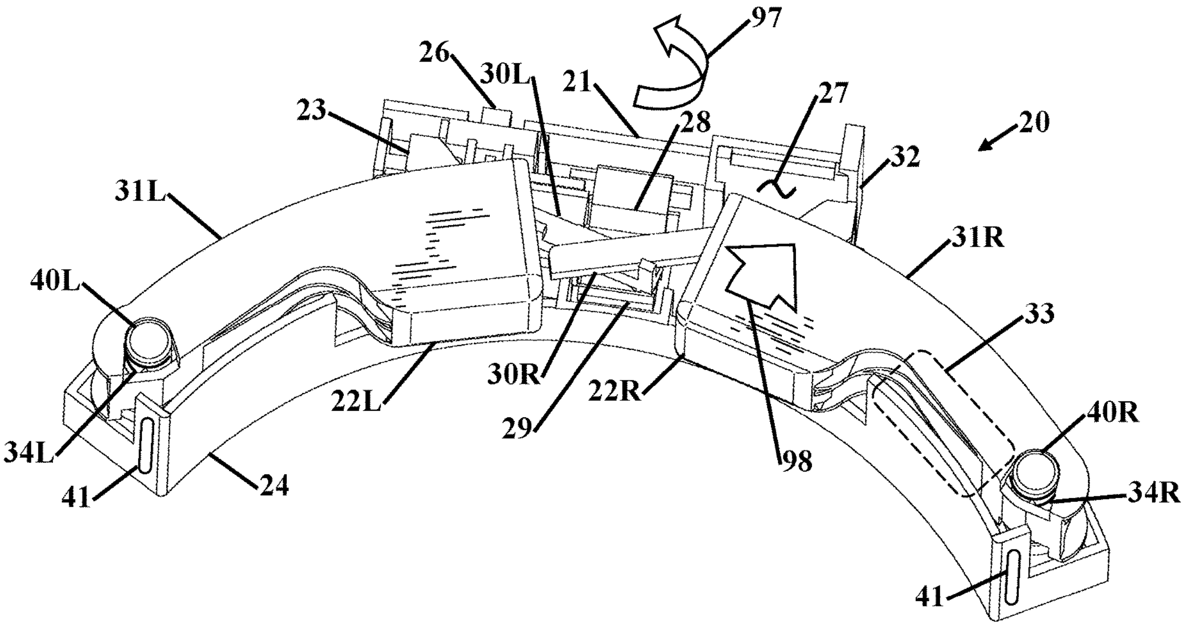
FIG. 2B shows the tinnitus neck tapper with the top housing removed.

FIG. 2A shows a top perspective view of the tinnitus neck tapper 20 and FIG. 2B shows the tinnitus neck tapper 20 with the top housing removed. There is a top housing 25 and a bottom housing that encloses the tapping mechanism where heads 22L and 22R pass intermittently to stimulate the back of the neck of a user placed against the inner radius wall 24. Each side of the housing shows a slot 41 for a strap or other mechanism to secure or hold the tinnitus neck tapper 20 in position. Each head 22L and 22R is connected with a separate arm body 31L and 31R, respectively that pivot on separate pivots 40L and 40R, respectively at a first end of said arm body 31L and 31R. A separate return torsion spring 34L and 34R bias the arms into the housing(s). At the second end of each arm body 31L and 31R are head arms 30L and 30R. One of the head arms (30L) is a dominant or master arm, whereas the head arm 30R is a slave arm 30R where the position or rotation of the slave arm 30R and head 22R is dependent on the position and movement of the master head arm 30L. While the left arm is shown as the dominant arm, either arm may be the dominant arm, or each arm can be independently controlled.

A motor 23 with a gear reduction turns a CAM 28 with one or a plurality of CAM arm(s) 29. In this embodiment there are three CAM arms 29 that provide three taps per rotation at 120 degrees of rotation 97. Each CAM arm 29 lifts 98 a tab on the head arm 30L and near the top of the rotation the CAM arm 29 clears the tab on the head arm 30L wherein the torsion spring(s) 34L and 34R rotate the heads 22L and 22R to make contact to the back (or side(s)) of the neck of the user.

On the back wall 21 of the tinnitus neck tapper 20 is switch 26 that turns the motor 23 on and off. The tinnitus neck tapper 20 has an internal battery 33 for operation but could be powered by an external power supply. A charging port 32 connects to a charging circuit 27 that charges the battery 33. While this embodiment shows and describes a rotating motor for control of the tapping motion, separate motors could be used with or without an encoder to sequence the tapping heads 22L and 22R.

Figure 3A:
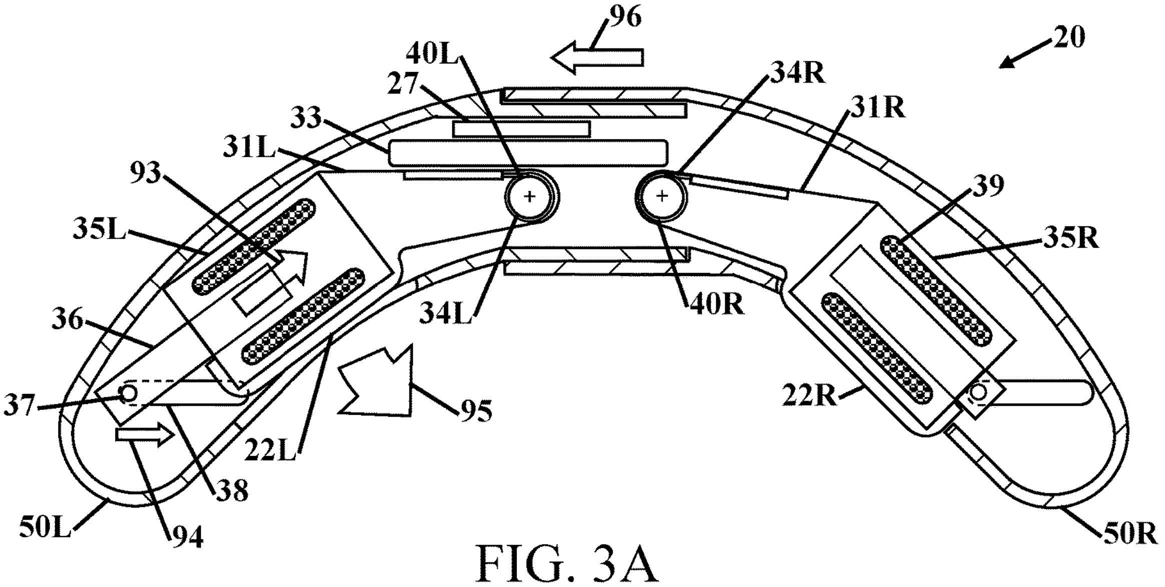
FIG. 3A shows a top sectional view of another preferred embodiment of the tinnitus neck tapper.
Figure 3B:
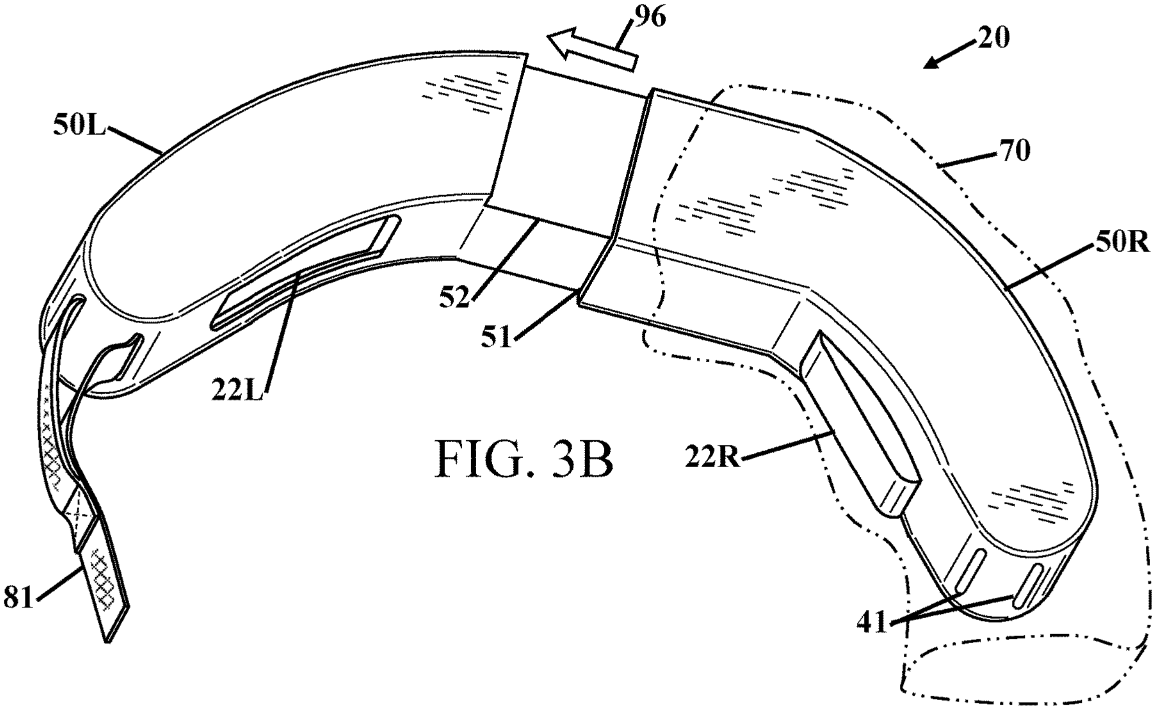
FIG. 3B shows a top perspective view of the tinnitus neck tapper from FIG. 3A with the enclosures.

FIG. 3A shows a top sectional view of another preferred embodiment of the tinnitus neck tapper 20 and FIG. 3B shows a top perspective view of the tinnitus neck tapper 20 from FIG. 3A with the enclosures. This preferred embodiment uses at least one solenoid 35L or 35R for the tapping motion. The configuration of the solenoids 35L and 35R are placed in a planar relationship in each side of the tinnitus neck tapper 20. To increase the mass of the impact of the head(s) 22L and 22R the solenoids 35L and 35R are placed within the heads 22L and 22R to move with the heads 22L and 22R. This also places the greatest amount of force from the coil winding(s) 39 on the plunger(s) when the heads 22L and 22R are extended out of the openings in the tinnitus neck tapper 20. The arm bodies 31L and 31R rotate from pivots 40L and 40R independently. The sectional view shows battery 33 and the charge/control circuit 27.

This embodiment shows torsion springs 34L and 34R that bias the heads 22L and 22R into the housings. While this embodiment shows torsion springs 34L and 34R on the pivots 40L and 40R, the springs could also be configured to operate on the plungers(s) 36. Each plunger 36 has a pin 37 that travels in a slot 38. In FIG. 3A the left head 22L is shown retracted in the housing 50L, while the right head 22R is shown extending from the housing 50R. The travel of the pin(s) 37 and plunger(s) 36 in the slot(s) 38 controls the rotation 95 of the heads from the body as the plunger 36 is pulled 93 into the solenoid by the energized coil winding 39 to slide 94 the pin 37 in the slot 38.

If FIG. 3B the enclosed and housed unit is shown. The left housing 50L can be extended 96 from the right housing 50R as an inner sleeve 52 is extended from an outer sleeve 51. While this embodiment shows a linear displacement, the housing could be telescoped apart with an arched arrangement. A strap 81 is shown passing through slots 41 in the left housing 50L. This embodiment shows a flexible sleeve 70 that can pass over the tinnitus neck tapper 20. The flexible sleeve 70 covering can be with an enclosed housing or in a fabric or other material that conforms and encapsulates the operation mechanism. A fabric covering can be stretched or pulled over the device and removed for replacement, cleaning or washing of the covering.

Figure 4:
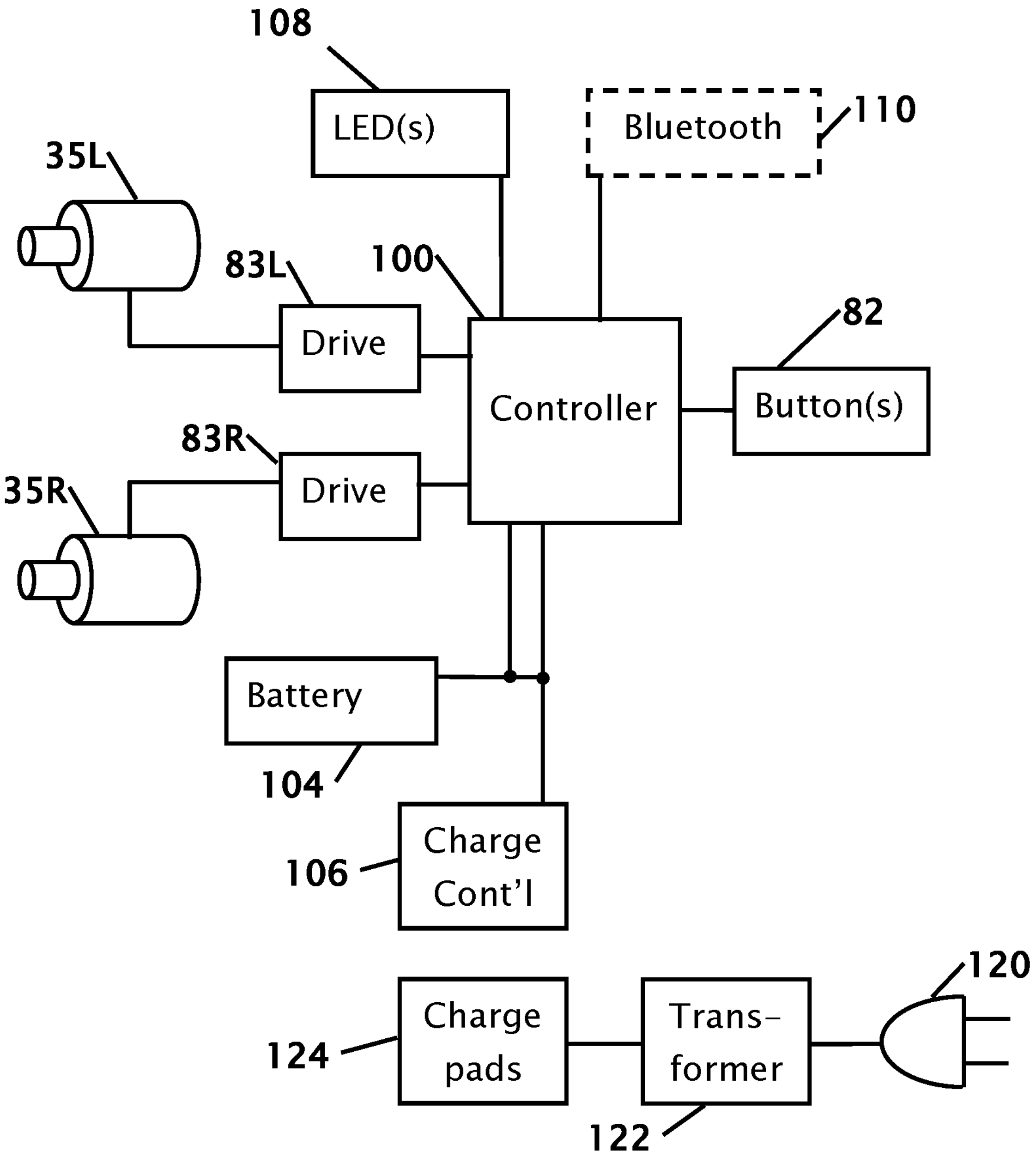
FIG. 4 shows a block diagram of the tinnitus neck tapper control electronics.

FIG. 4 shows a block diagram of the tinnitus neck tapper 20 control electronics. In the motor driven version, the motor can time the rate of tapping based upon the voltage applied to the motor. For the solenoid version, control of the rate and force of the solenoids 35L and 35R can be controlled by a controller 100 that operates drive circuits like transistors, SCR's, Triac, Diac, relay or other power circuit. In the block diagram each solenoid 35L and 35R is powered by a separate drive 83L and 83R, but a single drive could be used to operate both solenoids 35L and 35R at the same time. Using separate drive 83L and 83R controls allows for operation of a single solenoid (if tinnitus is only on one side). It also allows for different forces on each side as well as alternate tapping on opposing sides. Button(s) 82 allows for operation and adjustment of the solenoid(s).

The tapping force of the solenoids is contemplated at between 0.5 and 5 ounces of force, but forces of less than 0.5 ounces or greater than 5 ounces is contemplated. The tapping rate can also be adjusted and is contemplated at between a tap every few seconds to 10 taps per second, but other tapping rates can be generated. The number of total taps can be set as well as a number of taps and a pause before continuing multiple taps. One or more LED(s) 108 can be used to indicate charge (charging) level and that the device is "on". It is further contemplated that the tinnitus neck tapper could be connected with Bluetooth 110 or other wired or wireless communication to control or set the rate, force and quantity of taps. A battery 104 provides power to the tinnitus neck tapper. The battery is charged with a charge controller 106 from an external source through contacts, inductive or charge pads 124 from a transformer 122 and plug 120 or the like.

Thus, specific embodiments of a tinnitus neck tapper have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A tinnitus neck tapper comprising:

a housing configured for fitting at least partially around a back of a neck;

said housing having two separate pads that are configured for repeated tapping through said housing;

wherein said tapping is with at least one mechanical motor, a solenoid or a pneumatic mechanism, and said at least one solenoid further includes a spring that biases said at least one solenoid into said housing.

2. The tinnitus neck tapper according to claim 1, wherein said at least one pad is configured for said repeated tapping to a muscle or nerve located in the neck.

3. The tinnitus neck tapper according to claim 1, wherein there are two separate pads that are configured for locating said two separate pads on said neck on opposite sides of a spine of said neck.

4. The tinnitus neck tapper according to claim 3, wherein said at least two separate pads are biased out of said housing with at least one spring.

5. The tinnitus neck tapper according to claim 4, wherein a motor uses a rotating cam to overcome said at least one spring thereby retracting said at least two separate pads into said housing.

6. The tinnitus neck tapper according to claim 5, wherein said cam has a cam arm that releases said at least two separate pads such that said at least one spring rotate said at least two separate pads at least partially out of said housing.

7. The tinnitus neck tapper according to claim 6, wherein said spring is selected from a group of a torsion spring, a compression spring or an extension spring.

8. The tinnitus neck tapper according to claim 3, wherein a distance between said at least two separate pads is adjustable.

9. The tinnitus neck tapper according to claim 3, wherein each of said at least two separate pads are separately and independently controllable.

10. The tinnitus neck tapper according to claim 1, wherein a rate of said repeated tapping is adjustable.

11. The tinnitus neck tapper according to claim 10, wherein said repeated tapping is remotely controlled.

12. The tinnitus neck tapper according to claim 1, wherein a force of said repeated tapping is controlled by a voltage applied to said solenoid.

13. The tinnitus neck tapper according to claim 12, wherein there is a separate solenoid for each of said at least two separate pads.

14. The tinnitus neck tapper according to claim 1, wherein said housing is curved.

15. The tinnitus neck tapper according to claim 1, further includes at least one strap.

16. The tinnitus neck tapper according to claim 15, wherein said at least one strap includes control buttons that control said repeated tapping.

17. The tinnitus neck tapper according to claim 1, further includes a washable or changeable covering that covers at least a portion of said housing.

* * * * *